June 15, 1926.

J. PRIESNITZ 1,589,221

ELEVATING AND DEPRESSING DEVICE FOR IMPLEMENT FRAMES

Filed March 5, 1925　　2 Sheets-Sheet 1

J. Priesnitz, INVENTOR.

BY

Geo. P. Kimmel, ATTORNEY.

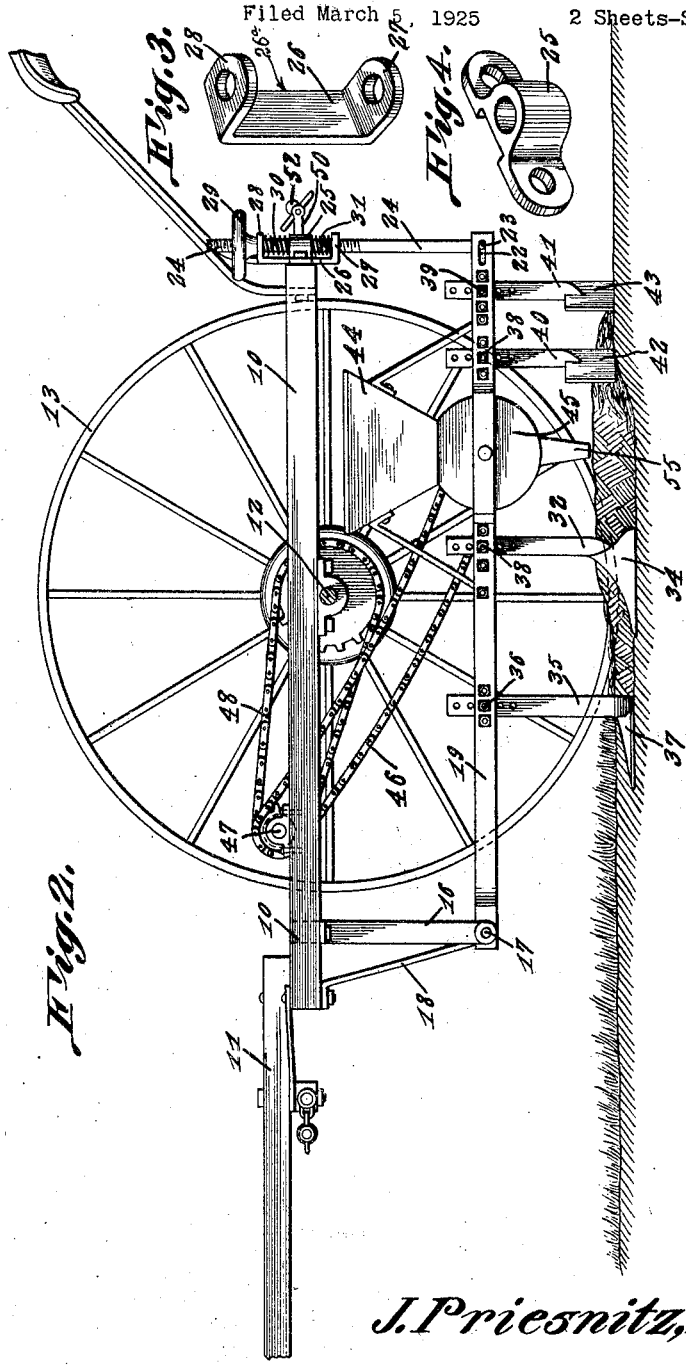

Patented June 15, 1926.

1,589,221

UNITED STATES PATENT OFFICE.

JOSEPH PRIESNITZ, OF OLMITZ, KANSAS.

ELEVATING AND DEPRESSING DEVICE FOR IMPLEMENT FRAMES.

Application filed March 5, 1925. Serial No. 13,216.

This invention relates to seeding machines, more particularly to machines arranged to plant sugar beet and like seeds, and has for one of its objects to simplifiy and improve the construction and increase the efficiency of devices of this character.

With these and other objects in view, the invention consists in certain novel features of construction as hereinafter shown and described and then specifically pointed out in the claim, and in the drawings illustrative of the preferred embodiment of the invention—

Figure 2 is a side elevation with a nigh carrier wheel detached and the axle in transverse section.

Figures 3 and 4 are enlarged detached perspective views of the guide members of the beam adjustment members.

Figure 1:
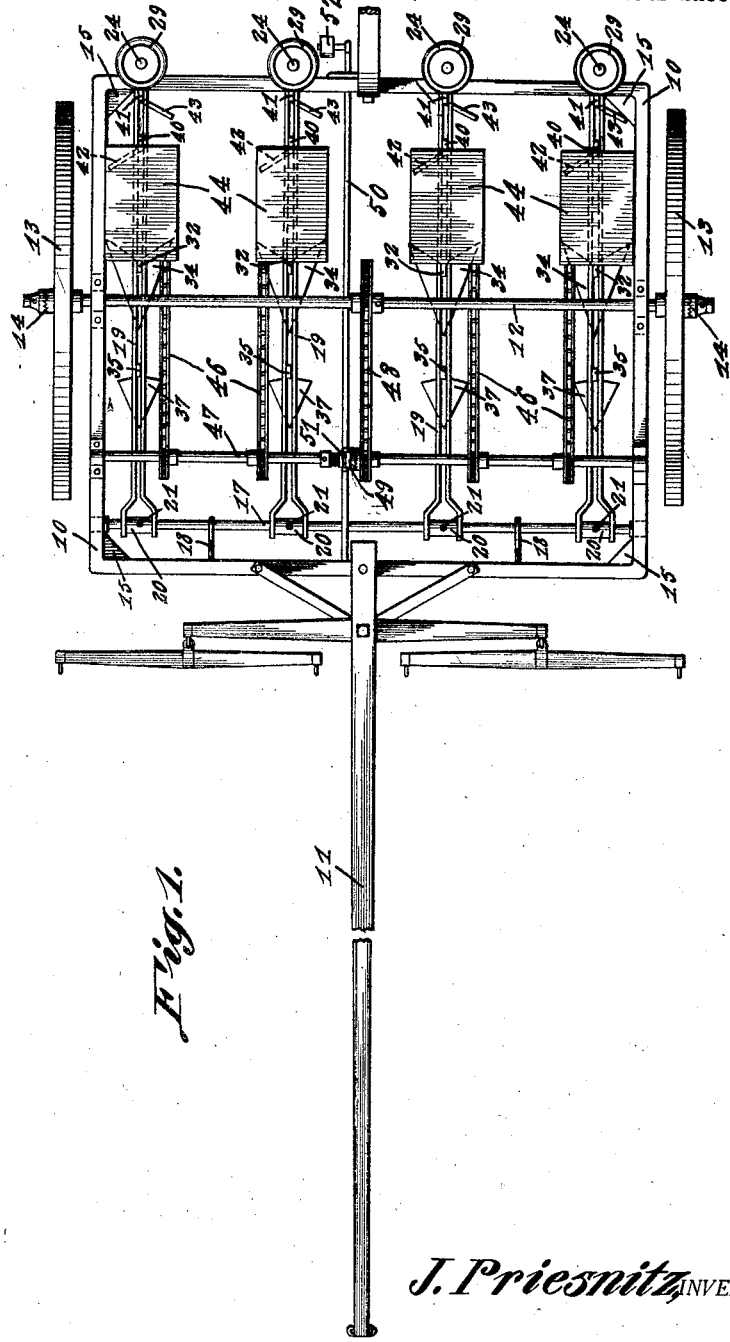
Figure 1 is a plan view of the improved apparatus.

The improved apparatus comprises an oblong supporting frame represented as a whole at 10, and provided with a draft tongue 11 and mounted on an axle 12, the latter carrying bearing wheels 13, loose on the axle and caused to be rotated by the axle in one direction by suitable backing ratchets indicated conventionally at 14. The frame 10 is supported at the corners by brace plates 15.

Depending fom the side members of the frame 10 are hangers 16, carrying a supporting shaft 17, the latter extending transversely of the framework in advance of the axle 12, and supported intermediate the ends from the framework by diagonal braces 18.

Mounted to swing upon the shaft 17 is a plurality of pairs of beam elements 19, each pair of beams being held in spaced relation by a sleeve or collar 20 upon the shaft 17, and each of the sleeves adjustably coupled to the rod by a set screw 21 or the like.

By this means the beams 19 are held from movement longitudinally of the shaft 17 but left free to swing thereon.

At its rear end each pair of the beams 19 is longitudinally slotted as at 22 to receive a pin 23 extending through the lower end of a threaded coupling rod 24. Attached to the rear member of the frame 10 opposite each pair of beams 19 is a guide 25 through which the rods 24 freely move. Sliding vertically through each guide is the bight 26 of an upset substantially U-shaped member 26ª whose legs 27 and 28 are positioned above and below the guide and apertured to slidably receive the rod 24. A wheel nut 29 engages the rod 24 and bears upon the upper outturned legs 27, while springs 30 and 31 bear between the guide 25 and the legs 27 and 28, as shown.

By this means, the beams 19 are yieldably supported at the rear both from upward and downward movement.

A standard 32 is connected at 33 to each pair of the beams 19 and each carrying a furrow opener 34 of suitable construction, and another standard 35 is connected at 36 between each pair of the beams 19 in advance of the standard 33, and each provided at its lower end with a cutter 37 to cut the ground in advance of the furrow opener.

Connected at 38 and 39 between each pair of the beams 19 rearwardly of the standards 32, are other standards 40 and 41, having covering blades or rakers 42 and 43 at their lower ends.

The beam members 19 are adapted to support seed dropper devices represented conventionally at 44—45, and arranged to be operated by chains 46 from a counter shaft 47 supported on the frame members 10, the latter operative by a chain 48 from the axle 12 and with a clutch element 49 associated with the chain driven mechanism. A shipper lever mechanism is represented including a rock shaft 50 having an upstanding yoke 51 to engage the clutch and a treadle 52 convenient to the driver on the seat, but as the seed dropper mechanism and its operating parts are disclosed in a prior application, which resulted in Patent No. 1,519,928, December 16, 1924, it is not necessary to further describe the same. A seed tube 55 is associated with the seed dropper, as shown in Figure 2.

The improved device is simple in construction, can be inexpensively manufactured, of any suitable material and any required capacity.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:

In an implement frame of the class described having a main frame and a plurality of auxiliary frames pivotally attached at their forward ends to the forward end of said main frame, a raising and lowering device for each of said auxiliary frames comprising a bracket fixed to said main frame, said bracket having a vertical groove on the side adjacent said frame, a substantially U-shaped member having its bight positioned to slide in said groove and having its legs one above and the other below said bracket, said bracket and legs being provided with apertures arranged in vertical alignment, a threaded rod attached to the free end of the auxiliary frame and extended through said apertures, a spring surrounding said rod between said bracket and each leg respectively, and an adjusting wheel threaded upon the upper end of said rod and bearing upon the upper leg.

In testimony whereof, I affix my signature hereto.

JOSEPH PRIESNITZ.